(12) United States Patent
Callaghan

(10) Patent No.: US 10,103,851 B2
(45) Date of Patent: *Oct. 16, 2018

(54) NETWORK LINK MONITORING AND TESTING

(71) Applicant: Amazon Technologies, Inc., Seattle, WA (US)

(72) Inventor: Stephen Callaghan, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,278

(22) Filed: Jul. 10, 2017

(65) Prior Publication Data

US 2017/0310432 A1    Oct. 26, 2017

Related U.S. Application Data

(63) Continuation of application No. 14/599,386, filed on Jan. 16, 2015, now Pat. No. 9,712,290, which is a continuation of application No. 13/610,457, filed on Sep. 11, 2012, now Pat. No. 8,937,870.

(51) Int. Cl.
*H04L 1/00* (2006.01)
*H04L 1/24* (2006.01)
*H04L 12/26* (2006.01)
*H04L 29/08* (2006.01)

(52) U.S. Cl.
CPC ............. *H04L 1/244* (2013.01); *H04L 43/50* (2013.01); *H04L 69/324* (2013.01)

(58) Field of Classification Search
None
See application file for complete search history.

(56) References Cited

U.S. PATENT DOCUMENTS

| | | |
|---|---|---|
| 4,853,927 A | 8/1989 | Wenzel |
| 5,477,531 A | 12/1995 | McKee et al. |
| 5,832,225 A | 11/1998 | Hacherl et al. |
| 5,864,662 A | 1/1999 | Brownmiller et al. |
| 6,185,612 B1 | 2/2001 | Jensen et al. |
| 6,377,987 B1 | 4/2002 | Kracht |
| 6,614,762 B1 | 9/2003 | Illiadis et al. |
| 6,654,914 B1 | 11/2003 | Kaffine et al. |
| 6,671,818 B1 | 12/2003 | Mikurak |
| 6,678,250 B1 | 1/2004 | Grabelsky et al. |
| 6,694,455 B1 | 2/2004 | Scrandis |

(Continued)

OTHER PUBLICATIONS

Batsakis, A., Practical Passive Lossy Link Inference, Proc. of PAM, 2005.

(Continued)

*Primary Examiner* — Bob A Phunkulh
(74) *Attorney, Agent, or Firm* — Knobbe, Martens, Olson & Bear, LLP

(57) ABSTRACT

In some embodiments, a link monitoring system ("LMS") is configured to obtain link status metrics and packet transmission metrics for network links forming a network channel between a first network device and a second network device. The LMS can obtain link status metrics from the first network device and the second network device and can also initiate the generation of packets on the network links to obtain the packet transmission metrics. Based on the status metrics and packet transmission metrics, the LMS can determine if the network links are malfunctioning.

20 Claims, 4 Drawing Sheets

(56) References Cited

U.S. PATENT DOCUMENTS

| | | |
|---|---|---|
| 6,738,933 B2 | 5/2004 | Fraenkel et al. |
| 6,747,991 B1 | 6/2004 | Hemy et al. |
| 6,823,479 B1 | 11/2004 | McElhaney et al. |
| 6,901,530 B2 | 5/2005 | Cerami et al. |
| 6,909,741 B1 | 6/2005 | Smith et al. |
| 6,978,302 B1 | 12/2005 | Chisholm et al. |
| 6,981,039 B2 | 12/2005 | Cerami et al. |
| 7,016,313 B1 | 3/2006 | Harper |
| 7,134,135 B2 | 11/2006 | Cerami et al. |
| 7,251,055 B2 | 7/2007 | Sawada et al. |
| 7,260,060 B1 | 8/2007 | Abaye et al. |
| 7,337,206 B1 | 2/2008 | Wen |
| 7,385,924 B1 | 6/2008 | Riddle |
| 7,423,995 B1 | 9/2008 | Elliott et al. |
| 7,441,154 B2 | 10/2008 | Klotz et al. |
| 7,457,868 B1 | 11/2008 | Guo |
| 7,525,922 B2 | 4/2009 | Cidon et al. |
| 7,546,609 B2 | 6/2009 | Florissi et al. |
| 7,609,650 B2 | 10/2009 | Roskowski et al. |
| 7,639,705 B2 | 12/2009 | Watanabe et al. |
| 7,706,373 B2 | 4/2010 | Xu et al. |
| 7,751,350 B1 | 7/2010 | Pabst |
| 7,788,536 B1 | 8/2010 | Qureshi et al. |
| 7,844,730 B2 | 11/2010 | Kawaguchi |
| 7,936,694 B2 | 5/2011 | Choudhury |
| 7,949,739 B2 | 5/2011 | Florissi et al. |
| 7,953,020 B2 | 5/2011 | Breslau et al. |
| 7,990,946 B2 | 8/2011 | Deguchi |
| 8,018,844 B2 | 9/2011 | Bender et al. |
| 8,050,182 B2 | 11/2011 | Yamamoto et al. |
| 8,098,583 B2 | 1/2012 | Cahn |
| 8,196,199 B2 | 6/2012 | Hrastar et al. |
| 8,204,980 B1 | 6/2012 | Sandstrom et al. |
| 8,223,655 B2 | 7/2012 | Heinz et al. |
| 8,254,272 B1 | 8/2012 | Vasseur |
| 8,300,554 B1 | 10/2012 | Vijendra et al. |
| 8,375,244 B2 | 2/2013 | Bobak et al. |
| 8,433,894 B2 | 4/2013 | Reznik et al. |
| 8,520,556 B2 | 8/2013 | Karuppiah et al. |
| 8,661,295 B1 | 2/2014 | Khanna et al. |
| 8,937,870 B1 | 1/2015 | Callaghan |
| 9,001,667 B1 | 4/2015 | Khanna et al. |
| 9,104,543 B1 | 8/2015 | Cavanagh et al. |
| 9,197,495 B1 | 11/2015 | Rauser et al. |
| 9,210,038 B1 | 12/2015 | Rauser et al. |
| 9,385,917 B1 | 7/2016 | Khanna et al. |
| 9,712,290 B2 | 7/2017 | Callaghan |
| 2002/0010735 A1 | 1/2002 | McMillen et al. |
| 2002/0016856 A1 | 2/2002 | Tallegas et al. |
| 2002/0107980 A1 | 8/2002 | Kawaguchi |
| 2002/0165957 A1 | 11/2002 | Devoe et al. |
| 2003/0156541 A1 | 8/2003 | Haihong |
| 2004/0034614 A1 | 2/2004 | Asher et al. |
| 2004/0044764 A1 | 3/2004 | Padmanabhan et al. |
| 2004/0044765 A1 | 3/2004 | Meek et al. |
| 2004/0208128 A1 | 10/2004 | Lu et al. |
| 2004/0252700 A1 | 12/2004 | Anandakumar et al. |
| 2005/0041593 A1 | 2/2005 | Kikuchi |
| 2005/0091361 A1 | 4/2005 | Bernstein et al. |
| 2005/0122996 A1 | 6/2005 | Azenkot et al. |
| 2005/0169185 A1 | 8/2005 | Qiu et al. |
| 2005/0210132 A1 | 9/2005 | Florissi et al. |
| 2005/0256961 A1 | 11/2005 | Alon et al. |
| 2006/0007870 A1 | 1/2006 | Roskowski et al. |
| 2006/0107086 A1 | 5/2006 | Walker et al. |
| 2006/0218447 A1 | 9/2006 | Garcia et al. |
| 2006/0259984 A1 | 11/2006 | Juneau |
| 2007/0047453 A1 | 3/2007 | Bender et al. |
| 2007/0053283 A1 | 3/2007 | Bidwell et al. |
| 2007/0064715 A1 | 3/2007 | Lloyd et al. |
| 2007/0086335 A1 | 4/2007 | McCanne et al. |
| 2007/0091811 A1 | 4/2007 | Thubert et al. |
| 2007/0201380 A1 | 8/2007 | Ma et al. |
| 2007/0263540 A1 | 11/2007 | Charzinski et al. |
| 2008/0049640 A1 | 2/2008 | Heinz et al. |
| 2008/0089235 A1 | 4/2008 | Kotrla et al. |
| 2008/0089236 A1 | 4/2008 | Kotrla et al. |
| 2008/0148099 A1 | 6/2008 | Bhat et al. |
| 2008/0186866 A1 | 8/2008 | Morinaga et al. |
| 2008/0205263 A1 | 8/2008 | Cooley et al. |
| 2008/0225733 A1 | 9/2008 | Hua et al. |
| 2008/0253295 A1 | 10/2008 | Yumoto et al. |
| 2008/0298271 A1 | 12/2008 | Morinaga et al. |
| 2009/0037771 A1 | 2/2009 | Morse et al. |
| 2009/0067483 A1 | 3/2009 | Casas et al. |
| 2009/0086643 A1 | 4/2009 | Kotrla et al. |
| 2009/0116404 A1 | 5/2009 | Mahop et al. |
| 2009/0122697 A1 | 5/2009 | Madhyasha et al. |
| 2009/0138618 A1 | 5/2009 | Li et al. |
| 2009/0245115 A1 | 10/2009 | Krishnaswamy et al. |
| 2009/0271513 A1 | 10/2009 | Liu et al. |
| 2009/0285101 A1 | 11/2009 | Lu |
| 2009/0290497 A1 | 11/2009 | Gibbings |
| 2010/0027415 A1 | 2/2010 | So et al. |
| 2010/0067396 A1 | 3/2010 | Cui et al. |
| 2010/0085948 A1 | 4/2010 | Yu et al. |
| 2010/0121910 A1 | 5/2010 | Kim |
| 2010/0157516 A1 | 6/2010 | Doorhy et al. |
| 2010/0161852 A1 | 6/2010 | Veni et al. |
| 2010/0165849 A1 | 7/2010 | Eisenberg et al. |
| 2010/0246408 A1 | 9/2010 | Kerber et al. |
| 2010/0278049 A1 | 11/2010 | Meloche et al. |
| 2010/0278056 A1 | 11/2010 | Meloche et al. |
| 2010/0316373 A1 | 12/2010 | Chang et al. |
| 2011/0007629 A1 | 1/2011 | Atlas et al. |
| 2011/0063979 A1 | 3/2011 | Matthews et al. |
| 2011/0063986 A1 | 3/2011 | Denecheau et al. |
| 2011/0078291 A1 | 3/2011 | Bickson et al. |
| 2011/0096675 A1 | 4/2011 | Li et al. |
| 2011/0134791 A1 | 6/2011 | So et al. |
| 2011/0164502 A1 | 7/2011 | Mohan et al. |
| 2011/0199911 A1 | 8/2011 | Ikada |
| 2011/0292813 A1 | 12/2011 | Dunbar et al. |
| 2011/0317580 A1 | 12/2011 | Kozisek et al. |
| 2012/0093004 A1 | 4/2012 | Nishi |
| 2012/0106561 A1 | 5/2012 | Horio |
| 2012/0109600 A1 | 5/2012 | Saeed et al. |
| 2012/0163163 A1 | 6/2012 | Kim et al. |
| 2012/0182864 A1 | 7/2012 | Heinz et al. |
| 2012/0213224 A1 | 8/2012 | Chen |
| 2012/0239256 A1 | 9/2012 | Hammerschmidt et al. |
| 2012/0278477 A1 | 11/2012 | Terrell et al. |
| 2012/0320784 A1 | 12/2012 | Edwards et al. |
| 2012/0327765 A1 | 12/2012 | Gibbings |
| 2013/0064075 A1 | 3/2013 | Pu |
| 2013/0070612 A1 | 3/2013 | Timus et al. |
| 2013/0117272 A1 | 5/2013 | Barga et al. |
| 2013/0308474 A1 | 11/2013 | Krzanowski et al. |
| 2014/0098685 A1 | 4/2014 | Shattil |
| 2014/0280884 A1 | 9/2014 | Searle et al. |
| 2015/0142970 A1 | 5/2015 | Callaghan |
| 2017/0155544 A1 | 6/2017 | Khanna |

OTHER PUBLICATIONS

Bu, T., et al., Network Tomography on General Topologies, Proc. of the ACM SIGMETRICS, Jun. 2002.

Cavanagh, et al., Determining Locations of Network Failures, U.S. Appl. No. 13/441,179, filed Apr. 6, 2012.

Coates, M., et al., Network Inference From Passive Unicast Measurements, Rice University, ECE Department, Technical Report, Jan. 21, 2000.

Khanna, R., et al., Monitoring and Detecting Causes of Failures of Network Paths, U.S. Appl. No. 13/077,589, filed Mar. 31, 2011.

Czepiel, S., Maximum Likelihood Estimation of Logistic Regression Models: Theory and Implementation, http://czep.net/stat/mlelr.pdf, available as of Feb. 5, 2005.

Kniaz, K., Non-Gradient Optimization Techniques (Nelder-Mead and Rosenbrock), http://www.kniaz.net/software/rosnm.aspx, May 2009.

McCabe, K.A., et al., Determining Impact of Network Failures, U.S. Appl. No. 13/959,566, filed Aug. 5, 2013.

(56) References Cited

OTHER PUBLICATIONS

Salakhutdinov, R., et al., Optimization With EM and Expectation-Conjugate-Gradient, Proceedings of the Twentieth International Conference on Machine Learning, Washington, D.C., 2003.

Sauro, J., What's a Z-score and Why Use it in Usability Testing?, http://www.measuringusability.com/z.htm, Sep. 17, 2004.

Sharman, K.C., Maximum Likelihood Parameters Estimation by Simulated Annealing, International Conference on Acoustics, Speech, and Signal Processing, pp. 2741-2744, Apr. 1988.

Tachibana, A., et al., Empirical Study on Locating Congested Segments Over the Internet Based on Multiple End-to-End Path Measurements, Proc. IEEE/IPSG International Symposium on Applications and the Internet, Jan. 2005.

Tsang, Y., et al., Passive Network Tomography Using EM Algorithms, IEEE International Conference on Acoustics, Speech, and Signal Processing, Proceedings, vol. VI, May 2001.

NETWORK LINK MONITORING AND TESTING

CROSS-REFERENCE TO RELATED APPLICATION

This application is a continuation of U.S. patent application Ser. No. 14/599,386, filed Jan. 16, 2015, entitled NETWORK LINK MONITORING AND TESTING, which is a continuation of U.S. patent application Ser. No. 13/610,457, filed Sep. 11, 2012, now U.S. Pat. No. 8,937,870, entitled NETWORK LINK MONITORING AND TESTING, the entirety of each of which is incorporated herein by reference for all purposes.

BACKGROUND

Computer networks generally include various interconnected computing devices that can exchange data. Computing devices in a computer network can be in direct communication with one or more other computing devices. Each direct communication connection between computing devices in a computer network may generally be referred to as a network link, or link. This link may be wired or wireless, though, generally, wired connections (e.g., optical cables, copper cables, etc.) are used in data centers and other settings where high bandwidth capabilities are desired. While a computer network is generally made up of a number of links, computing devices in a computer network do not typically include links to every other computing device in a computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an origin computing device to an identified destination computing device. If a packet of data is received by a computing device that is not the identified destination computing device, the receiving computing device becomes an intermediary in the communication path between the origin computing device and the destination computing device by forwarding the packet to another computing device in the computer network via one of its direct connections. Accordingly, each packet of data is transmitted through a series of intermediate links in the computer network until the packet reaches its destination computing device. The series of links for delivery of a packet of data between an origin computing device and a destination computing device is generally referred to as a network path, or path.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
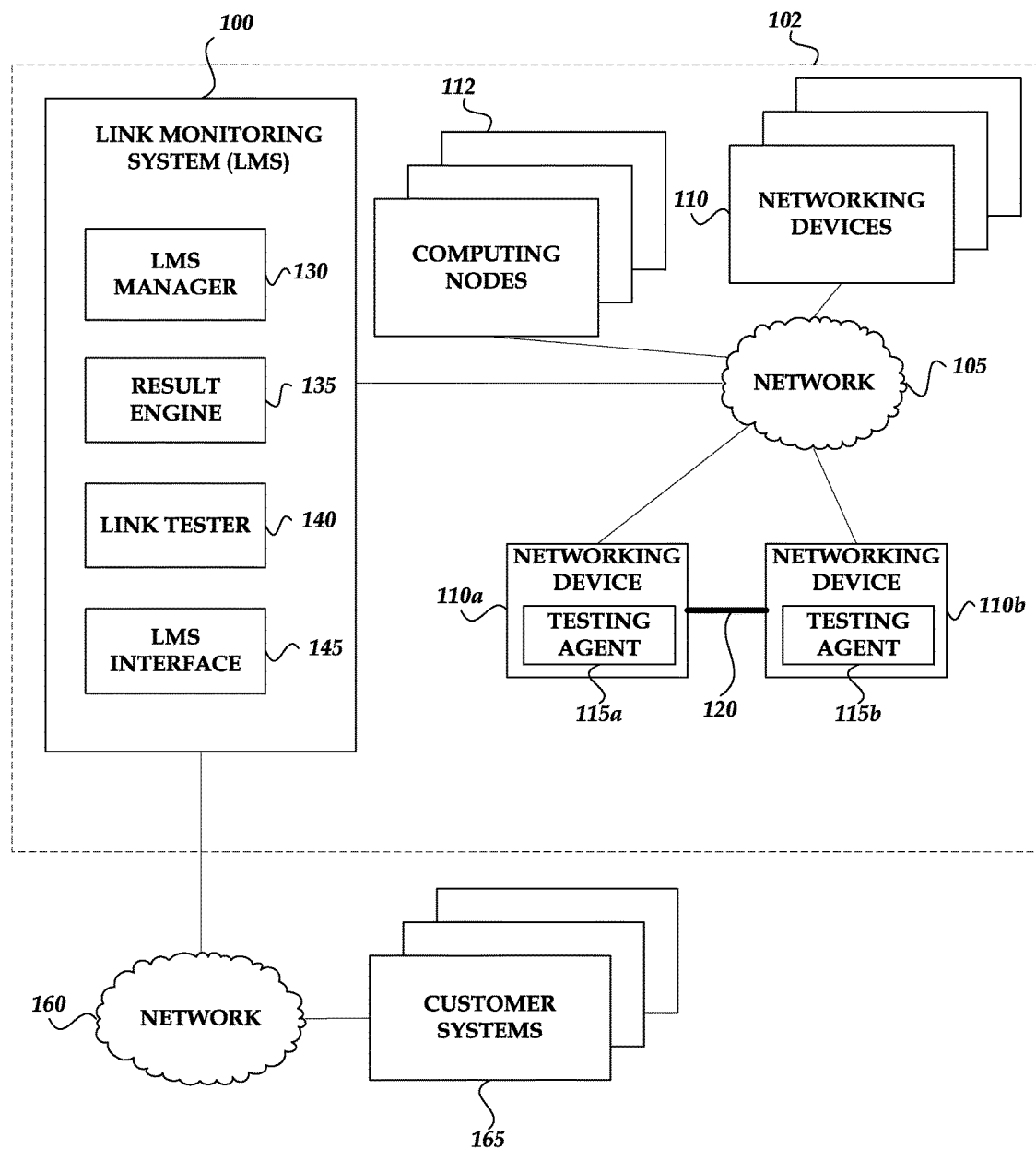
FIG. 1 is a network diagram schematically illustrating an embodiment of a link monitoring system that monitors the health of network links.

In a network, indications of total traffic on any one link in the network may be obtained by measuring packets transmitted or received on the two computing devices connected by that link. In some cases, a network link can be formed by the physical interfaces (e.g., a cable port or network interface card) at the two computing devices and the physical medium (e.g., a cable) connecting the interfaces. As networks become increasingly complex, network operators may desire to obtain information regarding the performance of large numbers of links. Performance of the links may include indications of network availability or failures, which may include an indication of dropped or lost packets, an indication of service degradation, or even of a network halt due to excessive traffic.

Network operators generally wish to ensure the highest availability possible for their network at the lowest cost possible. Problems relating to network failures generally affect the availability of the networks, and the costs associated with resolving the network failures affect the operators' overall costs.

Therefore, network operators typically wish to be able to accurately estimate the location of failures in their networks as quickly as possible in order to keep costs low and availability high. The location of failures may be, for example the devices or links whose failure or impaired operation is resulting in packets not reaching their desired destinations. There exist various tools to detect when network failures occur on a network. However, it may be difficult to find the location of those failures, particularly which individual link is causing a failure. For example, in some situations, several different components in the network may be affected by the same link failure. In other situations, several link failures may affect the same network component. In either of these circumstances, the network operator would want to detect the specific link or links causing a network failure. As networks increase in size and complexity, determining the location of those link failures becomes more difficult, due, at least partly, to the corresponding increase in links. For example, adding one new network device (e.g., a switch or router) will generally entail adding multiple additional links.

Embodiments of a link monitoring system ("LMS") are described below. In one embodiment, the link monitoring system 100 is configured to identify malfunctioning links by obtaining passive and active data about the links. For example, for a network channel between a first network device and a second network device, the system 100 can obtain link status metrics for the network links forming the network channel. The system 100 can receive link status metrics such as the status of port interfaces, the light levels through an optical cable and other readings related to the link. The link monitoring system 100 can identify whether the network links are provisionally functioning or are provisionally non-functioning based on the link status metrics. For example, if the light levels for a particular link are below a particular threshold, then the system 100 may identify that link as provisionally non-functioning. For each (or for some subset) of the provisionally functioning network links, the link monitoring system 100 can isolate each link and generate packet traffic on the link. In some embodiments, the system 100 can also generate packet traffic for the provisionally non-function links, for example, in order to confirm that the link is non-functioning. The link monitoring system can obtain from the first network device and the second network device packet transmission metrics for the generated packet traffic associated with each isolated link. The system can then identify links of the provisionally functioning network links that may be malfunctioning based at least partly on the packet transmission metrics. In some embodiments, the system 100 can generate one or more electronic reports identifying the malfunctioning links, such as, for example, a link failure report for a network administrator.

In one embodiment, the link monitoring system operates in a data center or other computing resource facility and monitors the health of the network links between computing assets in the data center. The computing assets can be used by a computing resource provider to provide computing services to its customers. The link monitoring system can be scaled up or down depending on the needs of the computing resource provider. For example, the link monitoring system may monitor multiple data centers or may monitor a portion of a data center.

By monitoring the health of network links, the link monitoring system can identify, relatively quickly compared to manual testing, problem links. For example, new network devices being added to the data center can typically be connected to the rest of the data center network by multiple links (e.g., less than 16 links, 16-64 links, more than 64 links), thereby introducing multiple new possible failure points. In many cases, two network devices are connected by a network channel comprising multiple links. The link monitoring system 100 can check the new links as they are added, allowing a network technician to pinpoint problems quickly before the problems can affect other devices and muddy the waters as to the source of the failure. In addition, in some embodiments, the link monitoring system monitors existing links and detects when a failure occurs, and may further initiate remediation steps for the failed link(s). By doing so, the system can likely increase the reliability of the data center. Rather than waiting for breakdowns or problems to arise, the link monitoring system can allow a data center operator to proactively identify and remedy issues before they cause problems.

Furthermore, compared to manual testing, the link monitoring system can be more reliable in detecting problems. For example, a technician typically checks link metrics at a single moment of time during a link test. However, in some cases such as a link that is about to fail, link metrics for that link will fluctuate, appearing to be fine in a first moment but not in a second moment. As embodiments of the link monitoring system can continuously or periodically monitor links, the system is more likely to detect these fluctuating links.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of a Link Monitoring System

FIG. 1 is a network diagram schematically illustrating an embodiment of a link monitoring system 100 that monitors the health of network links. In one embodiment, the link monitoring system 100 operates on a data center 102 operated by a computing resource provider. The data center can be used to provide network-based services to customers of the computing resource provider, such as a storage service, a computing resource provisioning service, a web hosting service, etc. The system 100 can monitor all (or some) of the assets in the data center. For some data centers, the system 100 may be monitoring 1,000, 10,000, 100,000, or more than 100,000 network links.

In some embodiments, the link monitoring system 100 includes various components that are connected via a first network 105, a system bus, or other communications medium. The first network 105 may include multiple networking devices such as, for example, switches, edge routers, core routers, etc. The first network 105 may, but need not be, a different network than the second network 160 shown in FIG. 1. In some embodiments, the link monitoring system 100 monitors links between and among networking devices 110, 110a, 110b (e.g., routers, switches, hubs, network links) computing nodes 112 (e.g., computing systems, storage systems, etc.), or other computing assets. For example, in the illustrated figure, the system 100 monitors the network links in a first network channel 120 between a first networking device 110a and a second networking device 110b. Testing agents 115a, 115b (collectively "testing agents 115") on the first and second networking device can conduct testing on the first network channel 120. In some embodiments, the testing agents are pre-existing software and/or hardware on the networking device for managing or monitoring the network devices. These testing agents can support specific protocols for device management, such as Simple Network Management Protocol ("SNMP"). In some embodiments, testing agents can also be found on computing nodes 112 to perform link testing.

In one embodiment, the testing agents 115 include SNMP agents that expose management data on managed systems (e.g., network devices 110) as variables. The SNMP protocol can also permit active management tasks to be initiated, such as modifying and applying new configuration settings through remote modification of these variables or initiating testing traffic on network links.

In the illustrated embodiment, the link monitoring system 100 includes: an LMS manager 130 for managing the various components and storing (e.g., on a data repository or other data storage) various data used by the link monitoring system 100, a result engine 135 for analyzing testing results, a link tester 130 for initiating and/or conducting testing on links, and a LMS interface 140 for interactions with users, such as network technicians or administrators. In one embodiment, the system 100 includes or communicates with testing agents operating on one or more of the computing nodes or networking devices for obtaining test data. In one embodiment, one or more of the components operate on separate computing devices connected through the network 105. In one embodiment, one or more of the components operate on the same computing device.

The link monitoring system 100 can be accessed by technicians and/or administrators within or external to the data center 102. For example, a network administrator in a control center may connect to the system's LMS interface 145 (e.g., a web service, application program interface, message protocol or the like) to observe the status of various links on the network and/or to initiate testing of specified network links on the network. In one embodiment, system 100 is connected via a network 160 to one or more customer systems 165 associated with customers receiving computing resources from the data center 102. Customers can use the customer interface 140 to monitor the link health of computing resources assigned to them. In some embodiments, the link data provided to customers is more general or limited than the link data available to data center personnel (e.g., technicians and/or administrators). For example, customers may be provided a link health score by the system 100 while data center personnel have access to a network topology map or other data structure identifying specific problem links.

The link monitoring system 100 may also communicate with other services, such as an inventory service that maintains data on assets for the data center. Such data can include network topology maps, neighbor data (e.g., which devices are connected), device details (e.g., how many ports or interfaces on the device), acceptable light levels for cables, types of cables connecting interfaces, listings of active assets, inactive assets (e.g., assets unavailable due to testing or repair).

In one embodiment, the LMS manager 130 is configured to monitor, track, and/or manage the processes of the link monitoring system 100. The manager 130 can be in communication with other components of the link monitoring system 100 via the network 105 or another communication medium. The monitoring system 100 can also include one or more data repositories for storing link metrics, network information, testing results, and the like.

In some embodiments, the result engine 135 analyzes passively acquired and/or actively generated metrics to determine the health of network links. Passively acquired metrics can include data on interface status, light levels, bi-directional echoes, voltages, buffer metrics or other link-related data that can be acquired during over the normal course of operation of the network devices and network links on the network. For example, excessive drops in voltages relative to cable distance and transmission power can indicate problems with network links. In another example, buffer overruns from packets awaiting transmission can indicate problems with network links, such as excessive packet loss or collisions. In some embodiments, passive metrics are obtained from device interfaces (e.g., network interface controller or ports) and/or from internal chip measurements of network devices, computing nodes or other computing assets. In some cases, the internal chip measurements overlap with the device interface measurements, but in some cases, at least some of the measurements may be for different things. For example, multiple device interfaces of a network device may be connected internally through a backplane to a switching element of the network device. The internal chip measurements may include measurements taken at the connection to the backplane rather than at the network connections at the device interfaces. Actively generated metrics can include data from active testing of the network links, such as packet transmission metrics taken during the active testing.

In some embodiments, the result engine 135 performs one or more of the following: checking that light levels are at acceptable levels; comparing metrics against expected norms, checking Cyclic Redundancy Check ("CRC") counters at device interfaces; and/or analyzing types of packet errors (e.g., whether the errors involve discarded, delayed packets, etc.).

In some embodiments, the result engine 135 can generate a link health score for every (or some) network link of the data center. In some embodiments, the link health score reflects the current health of a network link or an estimated probability of failure of the network link. The engine 135 can also track a network link's history, which can include records for instances of failure during operation or testing as well as historical link metrics taken over time or at particular instances. In some embodiments, the historical link metrics are used to determine acceptable levels for various link metrics. These acceptable levels can be compared with current readings of link metrics to identify abnormal readings.

In one embodiment, a passive and/or active link metrics are collected when a computing asset with network links is activated by the data center. For example, in response to a new computing asset (e.g., computing device or network device) being connected to the data center network, link metrics can be collected for the new links. In one embodiment, the link monitoring system 100 initiates active testing of the network links of the asset in order to identify problem links.

In some embodiments, the link tester 140 initiates testing of network links (and/or network channels such as network channel 120) automatically or at the direction of a user. For example, if passive metrics indicate a problem with a link, the link monitoring system 140 may initiate testing of the link. The link tester can coordinate with the various testing agents 115a, 115b to initiate tests on the network links on the network. It can then retrieve the results of those tests. Some tests may be performed directly on the asset while some tests may be performed using multiple assets. For example, testing the network connection of a target asset may require sending data and/or receiving data at agent assets in communication with the target asset. In one example, these agent assets are connected to the target asset via the links being tested. In some situations, such as for active assets currently in use by customers, the link tester 140 can coordinate with a reservation service to "check-out" or deactivate a link or asset(s) associated with the link to indicate that the link and/or assets should not be used. The reservation service can then stop assigning customers to those assets or activate a migration process to move customers using the assets to other active assets. In some cases, testing may be performed while the asset remains in active use.

The link monitoring system 100 can monitor the health of network links while the data center is operating. Such monitoring may be performed periodically, irregularly or continuously. In some embodiments, monitoring occurs in real-time or near real time. If a link is failing or has failed, the link monitoring system 100 can initiate remediation actions in response or can inform data center personnel of the problem (e.g., through alarms, reports, messages, etc.).

In some embodiments, the LMS interface 145 allows users to review link health data, receive reports on problems, and/or initiate testing. In one embodiment, the interface 145 includes a web service that receives reports, instructions, or other communications from user. For example, the interface 145 may include a web-based or other interface that provides functionality for web site operators, cloud computing service customers and/or other users to report problems with assets, including failure times, failure symptoms, crash logs, or the like.

In one embodiment, the computing nodes 112 comprise one or more physical computing systems capable of operating one or more virtual machines instances. For example, a host computing system may provide multiple virtual machines ("VM") instances and include a virtual machine manager to manage virtual machines (e.g., a hypervisor or other virtual machine monitor). Customers may operate hosted applications, such as web servers or services, on the computing nodes 112.

In some embodiments, data repositories are used by the link monitoring system 100 to store information. The data repositories can be local to components of the link monitoring system 100 or can be on networked or distributed systems. Such data repositories can include magnetic hard drives, solid state drives or memory, optical disc and/or the like. Various data structures can be used to store the data, such as electronic files, databases, or other data structure.

Figure 2:
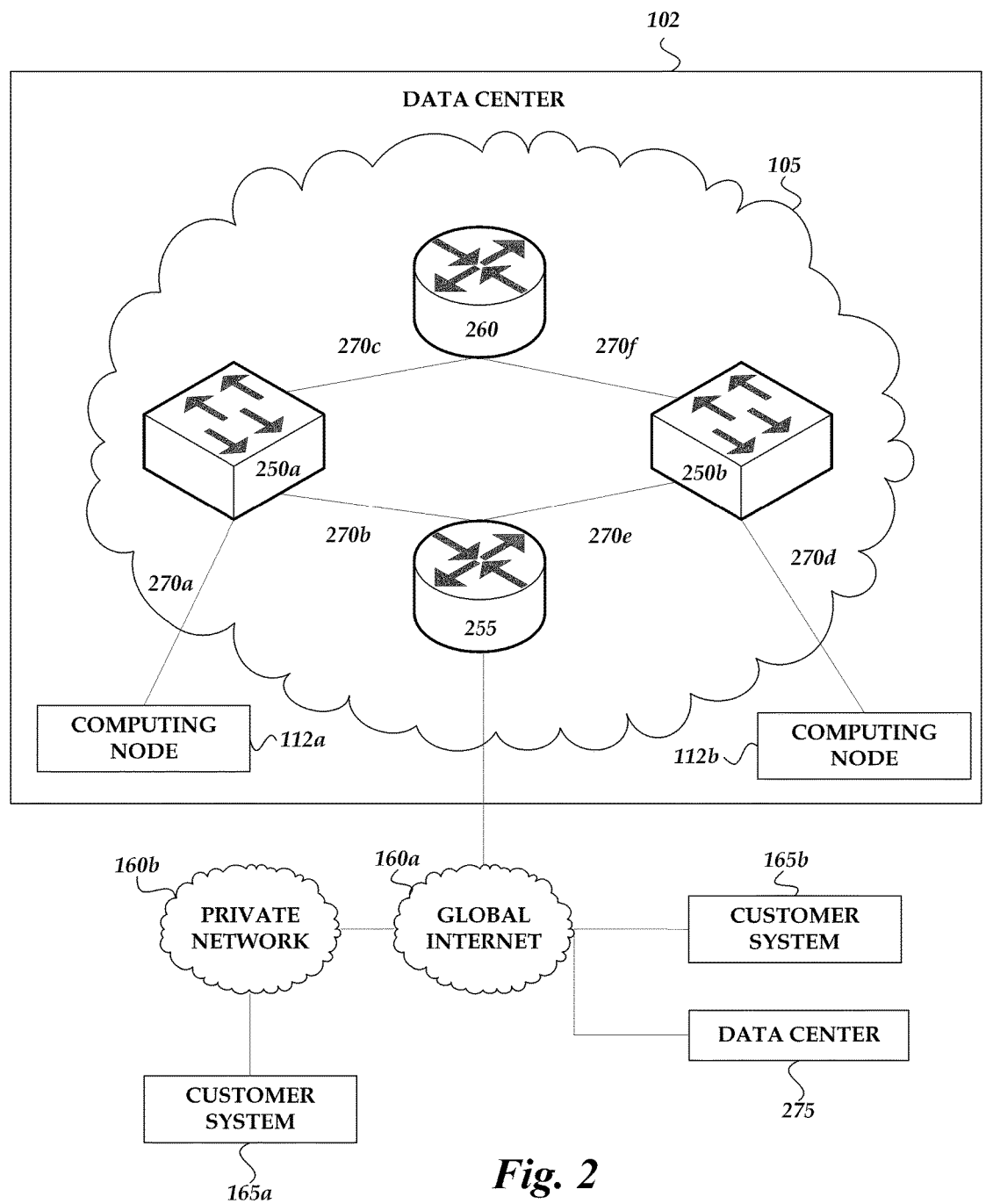
FIG. 2 schematically illustrates an embodiment of the first network of FIG. 1.

FIG. 2 schematically illustrates an embodiment of the first network 105 of FIG. 1. In the illustrated example, the network 105 may be part of a data center 102 having multiple computing nodes 112a, 112b. The network 105 can provide interconnections for communications between the computing nodes through various network devices. In some embodiments, the link monitoring system 100 monitors links between components of the network, including switches, routers, and/or nodes.

The network 105 can include various network devices, such as switches 250a-250b, edge router devices 255, core router devices 260 and network links 270a-270g. In the illustrated figure, switch 250a is part of a physical sub-network and is connected to computing node 112a through network link 270a, is connected to edge router 255 through network link 270b, and is connected to core router 260 through network link 270c. Switch 250b is part of another physical sub-network and is connected to computing node 112b via network link 270d, is connected to edge router device 255 via network link 270e, and is connected to core router 260 via network links 270f and 270g. The physical sub-networks established by switches 250a, 250b, can in turn, be connected to each other and other networks (e.g., the global internet 160a) via the edge routers 255 and/or the core routers 260. In one embodiment, the edge routers 255 provide gateways between two or more sub-networks or networks. In one embodiment, the core routers 260 manage communications within the network 105, such as by routing or otherwise forwarding packets or other data transmissions as appropriate based on characteristics of such data transmissions (e.g., header information including source and/or destination addresses, protocol identifiers, etc.) and/or the characteristics of the network 105 itself (e.g., routes based on the physical network topology, etc.).

In some embodiments, the link monitoring system monitors the various links 270a/b/c/d/e/f described above, which can include monitoring the corresponding interfaces or ports at the network devices. In some cases, these interfaces or ports are physically connected by cables. For example, the data center can have a rack of network devices with ports interconnected by cables, with some of the network devices further connected to other network devices in other racks. In some cases, data centers have hundreds or more various network devices with a corresponding large number of network links between the network devices.

In one embodiment, the network 105 is connected to a global internet 160a external to the data center 102. The global internet can provide access to one or more customer computing systems 165a via private network 160b, to one or more other globally accessible data centers 275 that each have multiple computing systems, and to one or more other computing systems 165b. The global internet 160a can be a publicly accessible network of networks, such as the Internet, and the private network 160b can be an organization's network that is wholly or partially inaccessible from computing systems external to the private network 160b. Customer computing systems 165b can be home computing systems or mobile computing devices that each connects directly to the global internet 160a (e.g., via a telephone line, cable modem, a Digital Subscriber Line ("DSL"), cellular network or other wireless connection, etc.). Customer computing systems 165b can also be computing assets in a corporate on-premise environment, such as servers in a large enterprise data center. In addition, data center network 105 can also be connected, through the global internet 1650a, to other data centers 275 operated by the same operator. For example, in some embodiments, the link monitoring system 100 of FIG. 1 manages network links found on multiple data centers or a central link monitoring system 100 manages individual data center link monitoring systems.

Figure 3:
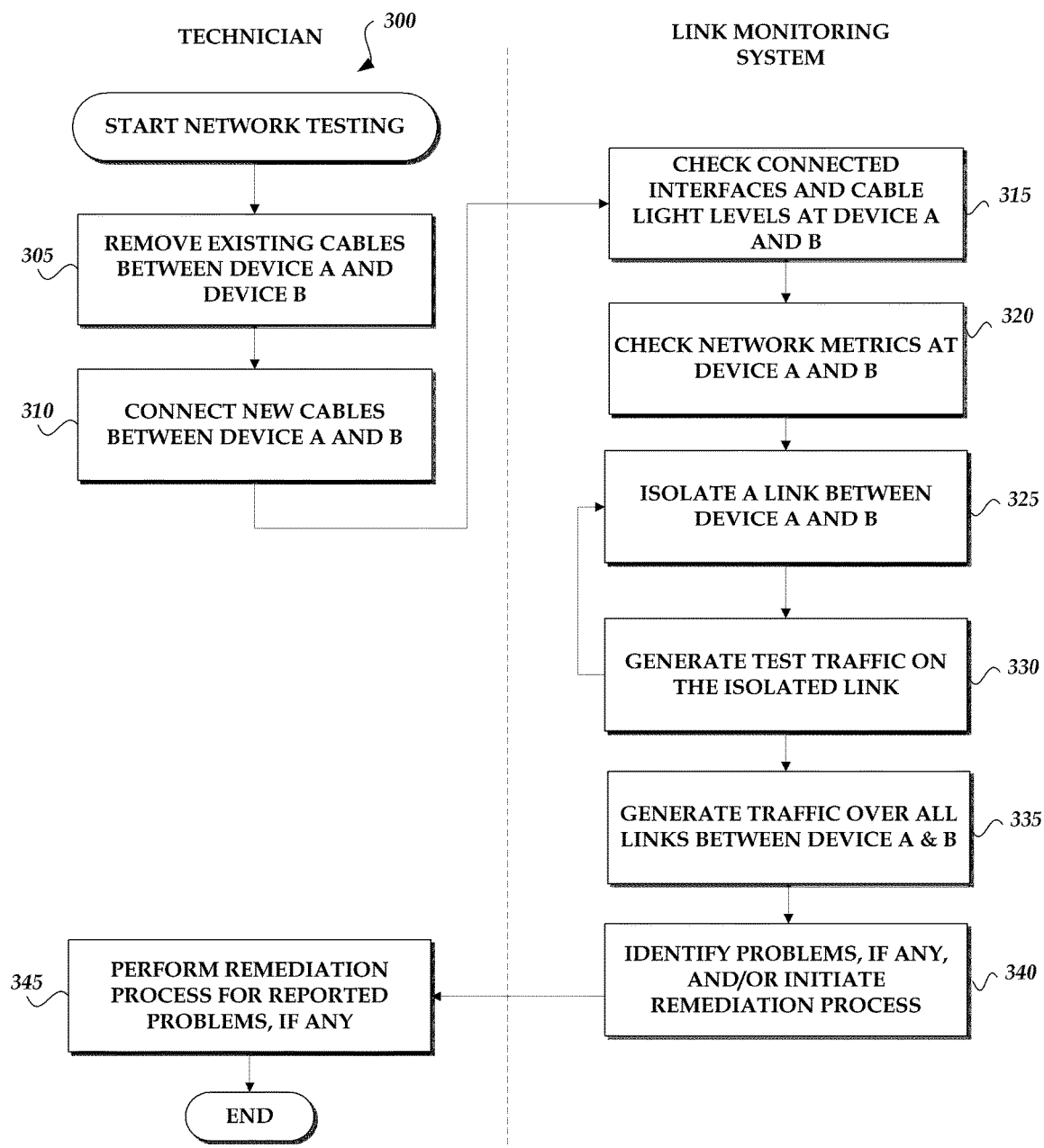
FIG. 3 schematically illustrates a logical flow diagram for a monitoring routine embodiment.

FIG. 3 schematically illustrates a logical flow diagram for a monitoring routine 300 embodiment. In some implementations, the routine is performed by embodiments of the link monitoring system 100 described with reference to FIG. 1 or by one of its components. For ease of explanation, the following describes the routine as performed by a technician (or other data center personnel) and the link monitoring system 100. The routine is discussed in the context of an example scenario that is intended to illustrate, but not to limit, various aspects of the link monitoring system 100.

Beginning at block 305, the technician removes existing cables (e.g., optical cables, copper cables, etc.) that form one or more network links between a first device ("Device A") and a second device ("Device B."). The first and second device can be network devices, computing nodes, or other computing assets that utilizes network links. In some embodiments, the network links between Device A and Device B form one or more channel groups.

In many data centers, the network links between devices are aggregated into channel groups or other link groupings through link aggregation. Various methods of combining or aggregating multiple network links are known in the field of computing networking. Aggregating network links in parallel can increase throughput beyond what a single connection could sustain, and can provide redundancy in case one of the links fails. Some examples of link aggregation techniques include port trunking, link bundling, Ethernet/network/Network Interface Controller ("NIC") bonding, NIC teaming, Link Aggregation Control Protocol ("LACP") and the like. In some embodiments, aggregation can either occur such that multiple interfaces share one logical address (e.g., a media access control (MAC) or internet protocol (IP) address), or it can be done such that each interface has its own address.

Link aggregation generally addresses one or both of two problems with Ethernet connections: bandwidth limitations and lack of resilience. Ethernet bandwidths historically have increased by an order of magnitude each generation: 10 Megabit/s, 100 Mbit/s, 1000 Mbit/s, 10,000 Mbit/s and 100,000 Mbit/s (or 40,000 Mbits). If bandwidth ceilings are reached, then one option is to move to the next generation; however this option could be cost prohibitive. An alternative solution is to combine two or more physical Ethernet or other network links into one logical link via link aggregation.

The second problem addressed by link aggregation involves building redundancy for the three potential points of failure in a typical port-cable-port connection. For example, in either the usual computer-to-switch or in a switch-to-switch configuration, the cable itself or either of the ports the cable is plugged into can fail. By aggregating network links into channel groups, one or more network links in the channel group can fail while still allowing network traffic to travel over the channel group.

At block 310, the technician connects new cables between Device A and Device B. As discussed above, link failures can be caused by failures in the interfaces or the physical cable. By replacing the cables, the errors due to faulty cables are reduced, simplifying troubleshooting of network link failures.

In some cases, removal of old cables may not be performed or may not be necessary. For example, the technician may be connecting a new device with no pre-existing connected cables. In another example, existing cables may be fairly new and unlikely to be causing problems, thus, replacing the existing cables may not be called for.

At block 315, the link monitoring system 100 checks connected interfaces and/or cable light levels ad Device A and Device B. In one scenario, a cable connects a first interface on Device A and a second interface on Device B. Management modules (e.g., testing agents 115a, 115b of FIG. 1) on Device A and Device B can detect if the first interface is physically connected with the second interface. The link monitoring system 100 can obtain interface data from the management modules, such as whether light or an electrical signal is flowing on the cable and being received on the first interface or the second interface.

For fiber optic cables, which are generally used in high bandwidth and high speed applications, proper passage of light through the cables are important for reliable operation. Light levels are one metric for measuring how well light travels over optical cables.

In some cases, contamination and/or damage of an optical cable can cause light loss. Contamination comes in many forms, from dust to oils to buffer gel. For example, touching the end-face of an optical cable can deposit an amount of body oil on the end-face sufficient to interfere with the cable's function. Further, dust and small static-charged particles float through the air and can land on any exposed termination. In addition, the fiber optic cable may be physically damaged, which can appear as a scratch, pit, crack, or chip on the end-face. These end-face surface defects could be the result of poor termination or mated contamination.

Similarly, contamination and/or damage to transceivers can cause problems in light loss. In some embodiments, fiber optic transceivers combine a fiber optic transmitter and a fiber optic receiver in a single module. In some embodiments, transceivers are arranged in parallel so that they can operate independently of each other. Both the receiver and the transmitter can have their own, independent circuitry and can handle transmissions in both directions. In fiber optic data links, the transmitter can convert an electrical signal into an optical signal, which can be transmitted through a fiber optic cable. The end of the cable can be coupled to a receiver, where a detector converts the light back into an electrical signal. In some embodiments, a light emitting diode (LED) or a laser diode is used as the light source.

Management modules on Device A and Device B can detect the light levels on optical cables connecting the devices. The link monitoring system 100 can then obtain light level data from the management modules. The light level data can indicate if the cables forming network links are contaminated and/or damaged.

At block 320, the link monitoring system 100 checks additional network metrics at Device A and Device B. These can include packet transmission metrics, such as the CRC error counters, runt packet counters, giant packet counters, packet counters, and/or packet error counters at the various interfaces of Device A and Device B. In some embodiments, the link monitoring system 100 obtains these network metrics from the management modules on Device A and Device B.

The CRC provides a way of detecting small changes in blocks of data. This type of error detection is especially useful when sending packet data across a network. Whereas the packet error counter can track missing or invalid packets, the CRC Error Counter checks the validity of the data inside the packets. Some devices have a CRC Error Counter at each interface (e.g., IN port(s) and OUT port(s)), although packets may, in some cases, be checked only at either the device's IN ports or OUT ports depending on where the packets are received. In some embodiments, the CRC error count increments by one for bad packets that are addressed to other devices or for packets received with a bad CRC.

At block 325, the link monitoring system 100 isolates a network link between Device A and Device B. As discussed above, network links are often grouped in channel groups. In those cases, the link monitoring system 100 can cycle through the network links included in a channel group to individually test each network link. As discussed above, the channel group can provide a redundant connection between devices, so even if one or more links have failed between Device A and Device B, the channel group may still allow traffic between the devices, albeit at a possibly degraded performance level. Isolating the links allows the link monitoring system 100 to test the individual links in the channel group.

In some embodiments, isolating a link includes shutting down the interfaces on Device A and Device B for the other links in the channel group. For example, if a channel group includes link A, B and C, the link monitoring system 100 can shut down link B and C in order to isolate link A. By isolating each network link, the link monitoring system 100 can pinpoint problems in the channel group to a particular problem link. In some embodiments, the link monitoring system 100 checks that the active interface is the same at both devices. Such a check can identify a problem with the interfaces or can identify a problem with the cable routing.

In some embodiments, the link monitoring system 100 checks the traffic level on the channel group before shutting down links. That way, if the channel group is busy, for example, if the channel group is busy carrying customer data, the link monitoring system 100 can postpone or cancel the testing so that it does not shut down links which may be busy. In some embodiments, the system 100 initiates shifting of existing traffic on the channel group to one or more other channel groups, so that testing can proceed. For example, the system 100 can manipulate network metrics (e.g., routing cost values of links or channel groups) in order to cause traffic to be routed to other channel groups.

At block 330, the link monitoring system 100 generates test traffic on the isolated link. The link monitoring system 100 can cause management modules on Device A and Device B to generate traffic between the devices. In one embodiment, the link monitoring system 100 causes the devices to send Internet Control Message Protocol ("ICMP") pings, echoes, or other generated traffic to each other. For example, the Device A may send ICMP echoes to Device B, which responds with echo replies. The link monitoring system 100 can check that the packets are received (e.g., by checking packet counters) and that the packets are valid (e.g., by checking CRC error counters). In one embodiment, the system 100 verifies the correctness of a received payload. For example, the system can check that the payload of a packet received at Device B is the same payload sent by Device A (or vice versa). In some cases, errors in the payload can suggest problems with the link.

In some embodiments, the link monitoring system 100 checks the traffic level on the channel group before sending the test traffic. That way, if the channel group is busy, for example, if the channel group is busy carrying customer data, the link monitoring system 100 can postpone or cancel the testing so that it does exceed the carrying capacity of the link, cause excessive packet collisions, or otherwise compromise the performance of the link.

In some embodiments, the link monitoring system 100 assigns a grade or score to the results of the test for each link. For example, the system can indicate that the link passed or failed the test using the grade. In one scenario, if packet transmission metrics of the test traffic do not meet certain thresholds or baseline values, the system 100 assigns a failing grade to the test, thereby indicating that there may be problem with the link.

In some embodiments, the link monitoring system 100 may cause the devices to send crafted or specially configured packets to each other. For example, with knowledge of the hashing function or other interface selection algorithm implemented by the devices, the link monitoring system 100 can cause a packet to be sent that is targeted to a particular interface. This can reduce or eliminate the need to isolate individual packets. For example, rather than isolating link A from links B and C, the link monitoring system 100 can cause packets to be sent that are configured to travel only on link A. In some embodiments, the packets may be configured to test other, specific aspects of the devices.

If the isolated link is one of multiple network links and some remaining links have not yet been tested, the link monitoring system 100 can proceed back to block 325 in order to isolate and test the remaining links. In some embodiments, the link monitoring system 100 loops through block 325 and block 330 until all the network links in the channel group are tested. However, in some embodiments, only a subset of the links is tested.

At block 335, the link monitoring system 100, in some embodiments, tests the channel group as a whole by generating traffic over all the links in the channel group between Device A and Device B. The link monitoring system 100 can bring all the links back up and then generate traffic over the links. Such a group test can identify problems with the link aggregation of the channel group or other problems that may not be apparent in the individual link tests. In some embodiments, the system 100 compares link metrics taken during the channel group test with historical metrics for that channel group and/or link metrics for other, similar channel groups. In some cases, differences can indicate problems with the channel group or with particular link(s) in the group.

At block 340, the link monitoring system 100 identifies problems, if any exist, based at least partly on the passive metrics and/or the active metrics. The link monitoring system 100 can analyze the metrics to identify the problems. For example, the link monitoring system 100 can check that packet counters at the two interfaces connected by a cable match or that reported metrics (e.g., light levels or CRC errors) are within acceptable norms. In some embodiments, the link monitoring system 100 tracks the link metrics during ordinary operation to build up a database of expected norms. It can then use these expected norms to identify acceptable ranges that can be used for comparison.

The link monitoring system 100 can also generate an electronic report, message, alarm, or other indication that there are problems with the network links. These indications can be provided to data center personnel, such as the technician or to a network administrator.

In some embodiments, the link monitoring system 100 initiates a remediation process to attempt fixes on the identified problems. For example, the link monitoring system 100 may automatically generate a trouble ticket in a ticketing system for an identified problem.

In some embodiments, the operations discussed in block 340 may be performed at other points in the routine. For example, some of the analysis can be performed after passive metrics are collected at block 320 but before active testing is performed at block 325. In some embodiments, this allows the link monitoring system 100 to identify and/or report problems earlier in the routine. In some cases, some of the blocks may be skipped (e.g., blocks involving active testing) because a problem has already been detected.

At block 345, the technician receives the indication of a problem or problems with the network links between Device A and Device B and performs a remediation process for those reported problems. For example, the technician may reroute incorrectly routed cables, replace cables, perform further manual testing, replace devices, replace device components (e.g., NICs) and/or perform other repairs. The routine can then end.

In some embodiments, the system 100 proceeds back to 315 in order to test the repairs performed by the technician. For example, if the technician performed a repair (e.g., replaced cables), the system 100 can check if the repair solved the link by performing block 315 and/or the subsequent blocks. In some embodiments, the system 100 checks passive link metrics only, active link metrics only or both passive and active link metrics.

Figure 4:
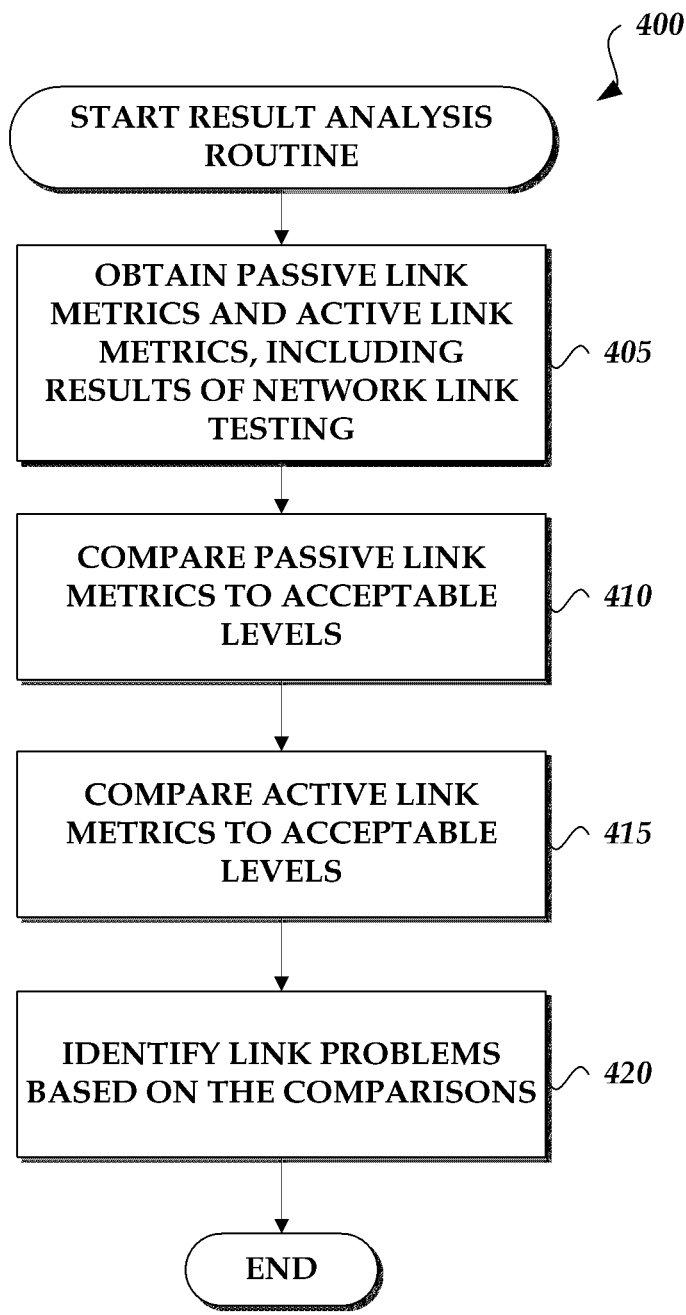
FIG. 4 schematically illustrates a logical flow diagram for an embodiment of a result analysis routine.

FIG. 4 schematically illustrates a logical flow diagram for an embodiment of a result analysis routine 400. In some implementations, the routine is performed by embodiments of the link monitoring system 100 described with reference to FIG. 1 or by one of its components. For ease of explanation, the following describes the routine as performed by the link monitoring system 100. In some embodiments, the result analysis routine 400 is performed during block 340 of the network testing routine 300 of FIG. 3 in order to identify network link problems. The routine is discussed in the context of an example scenario that is intended to illustrate, but not to limit, various aspects of the link monitoring system 100.

Beginning at block 405, the link monitoring system 100 obtains passive link metrics and active link metrics, including the results of network link testing. In some situations, the link monitoring system initiated the network link testing. In some embodiments, the system 100 obtains the passive link metrics and/or the active link metrics from management modules (e.g., testing agents 115 of FIG. 1) operating on monitored devices (e.g., networking devices 110 or computing nodes 112). In some embodiments, a data collection system collects the network link data and stores the network link data in a data repository, which the link monitoring system 100 accesses to obtain the network link data.

At block 410, the link monitoring system 100 compares passive link metrics to acceptable levels. As discussed above, in some embodiments, the link monitoring system 100 tracks the link metrics during ordinary operation to build up a database of acceptable levels during non-problematic operation. For example, the link monitoring system 100 can check that packet counters at the two interfaces connected by a cable match or that reported metrics (e.g., light levels or CRC errors) are within acceptable norms. In some embodiments, the system 100 determines the acceptable levels based on industry best practices or industry norms, such as may be identified in industry specifications. For example, Ethernet specifications, such as those issued by the Institute of Electrical and Electronics Engineers ("IEEE"), can include requirements for acceptable link metrics for proper implementation of the Ethernet standard. In some embodiments, the system 100 determines acceptable levels based on data from similar links. For example, a large data center may have multiple links that have the same or similar cable quality, cable type, and/or cable length. In some embodiments, the system 100 assumes that these similar links should behave similarly and uses link metrics from one or more similar links (e.g., a mean or median) as the acceptable level. In some embodiments, the system 100 uses a combination of two or more of the above techniques to determine the acceptable levels.

In some embodiments, the system 100 may use multiple, different values for acceptable levels based on the characteristics of the link, such as the length of the cable. For example, a short cable can generally be expected to have less light loss than a longer cable, so the acceptable level of light loss for a link that uses a short cable can be lower than for a link using a long cable.

At block 415, the link monitoring system 100 compares the active link metrics to acceptable levels. In some embodiments, the link monitoring system 100 tracks the link metrics during previous tests where no problem was found in order to determine acceptable levels during non-problematic operation. For example, the link monitoring system 100 can compare metrics obtained during testing, such as CRC errors, packet loss, alignment errors, collision rate, late collisions, Frame Check Sequence ("FCS") errors, or the like, with expected norms.

In some embodiments, the link monitoring system 100 determines the type of packet errors detected based at least partly on the collected active and/or passive metrics. For example, the link monitoring system 100 can check the number of packets discarded, delayed packets, packet collisions or the like, and compare them with known acceptable levels. In some cases, acceptable levels are determined based on observed metrics during normal operation and service level agreements ("SLAs") for the particular customer. For example, some customers may pay for higher level of services so that acceptable levels may be different than for other customers that haven't requested particular service levels. As discussed above, the acceptable levels may be based on industry best practices, historical levels, and/or metrics for comparable or similar links. There may also be multiple, different values for acceptable levels based on the characteristics of the link.

At block 420, the link monitoring system 100 identifies link problems based on the comparisons of the passive link metrics and/or active link metrics. In some embodiments, the link monitoring system 100 generates a report, message, alarm, or other indication that there are problems with the network links. These indications can be provided to data center personnel, such as the technician or to a network administrator. The routine 400 can then end.

Additional Embodiments

Many variations of the link monitoring system 100 are possible. For example, while embodiments above have been described as testing channel groups, in some embodiments, the link monitoring system 100 tests single network links. Further, while embodiments above describe the link monitoring system 100 working in conjunction with a technician, in some embodiments, the link monitoring system 100 work independently, such as when monitoring existing network links. Other variations are also possible.

As described above, the link monitoring system 100 can be implemented with one or more physical servers or other computing machines, such as several computing machines interconnected via a network. Thus, each of the components depicted in the link monitoring system 100 can include hardware and/or software for performing various features. In one embodiment, the link monitoring system 100 is implemented on a computing system that hosts a web site or collection of web sites that the system 100 monitors.

The link monitoring system 100 can include one or more servers for receiving and responding to network requests from the customer systems 165. The one or more servers can include web servers, application servers, database servers, combinations of the same, or the like. In some embodiments, the network 105 is a publicly accessible network of linked networks, possibly operated by various distinct parties, such as the Internet. In other embodiments, the network 105 may be a private network, such as, for example, a corporate or university network that is wholly or partially inaccessible to non-privileged users. In still other embodiments, the network 105 may include one or more private networks with access to and/or from the Internet.

The processing of the various components of the link monitoring system 100 can be distributed across multiple machines, networks and other computing resources. The various components of the link monitoring system 100 can also be implemented in one or more virtual machines, rather than in dedicated servers. Likewise, data repositories can include represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the link monitoring system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of interactions (additionally or alternatively) between the link monitoring system 100 and the users and/or customer systems are possible in addition to those described above. For example, a link monitoring system 100 interaction can be received directly from a user (e.g., via an interactive console, web browser, or other GUI provided by the link monitoring system 100) or from an executing program, such as one on a customer computing system 165. In some embodiments, users may interact with the link monitoring system 100 using other types of interfaces and in other ways.

In some embodiments, the link monitoring system 100 and its components are executed or embodied by one or more physical or virtual computing systems. For example, in some embodiments, a server computing system that has components including a central processing unit (CPU), input/output (I/O) components, storage, and memory may be used to execute some or all of the components of the link monitoring system 100. The I/O components can include a display, a network connection to the network 105, a computer-readable media drive, and other I/O devices (e.g., a keyboard, a mouse, speakers, etc.). In some embodiments, the link monitoring system 100 may be configured differently than described above.

An embodiment of the link monitoring system 100 can be stored as one or more executable program modules in the memory of the server and/or on other types of non-transitory computer-readable storage media, and the link monitoring system 100 can interact with computing assets over the network 105. In one embodiment, the link monitoring system 100 may have additional components or fewer components than described above. For example, the link monitoring system 100 may be built on top of existing software development or testing systems and designed to coordinate the actions of the existing systems.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A system comprising:
   a non-transitory data store configured to store computer-executable instructions; and
   a hardware processor in communication with the data store, the hardware processor configured to execute the computer-executable instructions to at least:
   isolate a first network link from a plurality of active network links of a network channel between a first computing asset and a second computing asset, wherein each network link of the plurality of active network links corresponds to a direct communication connection between the first computing asset and the second computing asset;
   obtain one or more packet transmission metrics associated with the first network link, wherein the one or more packet transmission metrics correspond to packet traffic on the first network link;
   obtain one or more historical packet transmission metrics associated with the first network link;
   determine, based at least in part on the one or more packet transmission metrics associated with the first network link and the one or more historical packet transmission metrics associated with the first network link, a link health score of the first network link, wherein the link health score of the first network link corresponds to a probability of failure of the first network link; and
   determine that the probability of failure of the first network link exceeds a threshold.

2. The system of claim 1, wherein the one or more historical packet transmission metrics comprise one or more previous link health scores of the first network link.

3. The system of claim 1, wherein the first network link is formed by at least one of a wired physical medium connecting the first computing asset and the second computing asset or a wireless physical medium connecting the first computing asset in the second computing asset.

4. The system of claim 1, wherein the processor is further configured to cause generation of the packet traffic on the first network link.

5. The system of claim 1, wherein the one or more historical packet transmission metrics comprise one or more instances of failure of the first network link.

6. The system of claim 1, wherein the link health score of the first network link is determined based at least in part on a comparison of the one or more packet transmission metrics and the one or more historical packet transmission metrics.

7. A computer-implemented method comprising:
   under control of a computing device configured with specific computer-executable instructions,
   isolating a first network link from a plurality of active network links of a network channel between a first computing asset and a second computing asset, wherein each network link of the plurality of active network links corresponds to a direct communication connection between the first computing asset and the second computing asset;

obtaining active link information for the network channel, wherein the active link information corresponds to packet traffic on the first network link;

obtaining historical link information associated with the first network link;

determine, based at least in part on the active link information and the historical link information, a link health score of the first network link, the link health score of the first network link indicating a probability of failure of the first network link; and determine that the probability of failure of the first network link exceeds a threshold.

8. The computer-implemented method of claim 7 further comprising:

in response to the probability of failure of the first network link exceeding the threshold, causing a remediation action.

9. The computer-implemented method of claim 8, wherein the remedial action comprises at least one of generating a trouble ticket in a ticketing system, generating an alarm, or sending a message.

10. The computer-implemented method of claim 7, wherein the active link information includes at least one of Cyclic Redundancy Check (CRC) error counts, packet counts, payload correctness, or packet error counts.

11. The computer-implemented method of claim 7, wherein the historical link information includes at least one of Cyclic Redundancy Check (CRC) error counts, packet counts, payload correctness, or packet error counts.

12. The computer-implemented method of claim 7 further comprising determining the threshold.

13. The computer-implemented method of claim 12, wherein the threshold is determined based at least in part on the historical link information.

14. The computer-implemented method of claim 7 further comprising identifying, based at least in part on the historical link information, one or more acceptable ranges for the active link information.

15. The computer-implemented method of claim 14, wherein the link health score is determined based at least in part on the one or more acceptable ranges for the active link information.

16. A non-transitory computer readable storage medium configured to store computer-executable instructions that, when executed by a processor, perform operations comprising:

isolating a first network link from a plurality of active network links of a network channel between a first computing asset and a second computing asset, wherein each network link of the plurality of active network links corresponds to a direct communication connection between the first computing asset and the second computing asset;

obtaining active link information for the network channel, wherein the active link information corresponds to packet traffic on the first network link;

determining, based at least in part on the active link information and historical link information associated with the first network link, a link health score of the first network link, wherein the link health score of the first network link is associated with a probability of failure of the first network link; and determine that the probability of failure of the first network link exceeds a threshold.

17. The non-transitory computer readable storage medium of claim 16, wherein determining the link health score of the first network link is further based, at least in part, on historical link information corresponding to another network link of the plurality of active network links.

18. The non-transitory computer readable storage medium of claim 16, wherein the active link information for the network channel is obtained from at least one of the first computing asset or the second computing asset.

19. The non-transitory computer readable storage medium of claim 16, wherein the historical link information comprises one or more historical link health scores.

20. The non-transitory computer readable storage medium of claim 19, the operations further comprising determining the threshold based at least in part on the one or more historical link health scores.

* * * * *